United States Patent [19]

Cowx

[11] 4,424,988
[45] Jan. 10, 1984

[54] FRANGIBLE PIPE COUPLING

[75] Inventor: Douglas B. Cowx, Welland, Canada

[73] Assignee: Consumers' Gas Company Limited, Willowdale, Canada

[21] Appl. No.: 334,717

[22] Filed: Dec. 28, 1981

[51] Int. Cl.³ .................. F16L 55/00; F16L 37/00; F16L 17/00; F16L 35/00

[52] U.S. Cl. .............................. 285/2; 285/4; 285/368; 285/18

[58] Field of Search .................. 285/2, 3, 4, 18, 368, 285/412

[56] References Cited

U.S. PATENT DOCUMENTS

| | | | |
|---|---|---|---|
| 3,659,877 | 5/1972 | Kubasta | 285/3 |
| 3,747,196 | 7/1973 | Whittington | 285/3 X |
| 4,059,288 | 11/1977 | Mohr | 285/2 |
| 4,169,507 | 10/1979 | Szymczak | 285/3 X |

Primary Examiner—Richard J. Scanlan, Jr.
Attorney, Agent, or Firm—Robert F. Delbridge; Arne I. Fors

[57] ABSTRACT

A frangible pipe coupling includes a pair of pipes with a plurality of frangible connectors extending between the pipes and normally holding the pipes in sealed engagement with one another. An annular member surrounds one of the pipes and is slidably mounted thereon for longitudinal sliding movement relative thereto, the annular member cooperating with the pipe to form a chamber therebetween. Fluid is supplied under pressure into the chamber to effect longitudinal sliding movement of the annular member relative to the pipe, the annular member being connected to the frangible connectors to cause the relative movement between the annular member and the pipe to break the frangible connectors and thereby separate the pipes from one another.

5 Claims, 2 Drawing Figures

FRANGIBLE PIPE COUPLING

This invention relates to frangible pipe couplings comprising a pair of pipe members which are normally connected in sealing engagement with each other by connecting means which can be broken to effect separation of the pipe members.

Such frangible pipe couplings are used for example in riser assemblies connected between an oil or gas wellhead at the bottom of a body of water and a vessel on the surface of the water. Such riser assemblies normally include swivel and/or sliding couplings to accommodate a limited amount of movement of the vessel relative to the wellhead such as is caused by normal waves and/or wind. However, such swivel and/or sliding couplings are only capable of accommodating small relative movements between the vessel and the wellhead. For example, if a storm occurs, the installation may well be damaged if the vessel remains connected to the wellhead.

U.S. Pat. No. 4,169,507 (Szymczak) issued Oct. 2, 1979 describes a frangible coupling for such a wellhead installation in which relative longitudinal movement between a pair of pipe members causes frangible bolts to be broken and a lower coupling to be disconnected by a hydraulic signal generated by relative movement between the pipe members after breakage of the frangible bolts. However, the operation of such an arrangement can only be initiated by mechanically pulling one pipe member longitudinally away from the other pipe member.

It is therefore an object of the invention to provide a more versatile frangible pipe coupling of this kind.

According to the present invention, a frangible pipe coupling comprises a pair of pipe members, frangible means connecting the pipe members together, said frangible connecting means comprising a plurality of frangible connectors extending between the pipe members and normally holding the pipe members in sealed engagement with one another, an annular member surrounding one of the pipe members and being slidably mounted thereon for longitudinal sliding movement relative thereto, said annular member cooperating with said one pipe member to form a chamber therebetween, means for supplying fluid under pressure into said chamber to effect longitudinal sliding movement of the annular member relative to the said one pipe member, said annular member being connected to the frangible connectors to cause said relative movement between the annular member and the said one pipe member to break said frangible connectors and thereby separate the pipe members from one another.

Thus, the pipe members may be separated by application of fluid under pressure to the chamber. Additionally, the pipe members may also be separated by the intentional or unintentional application of a sufficient longitudinal force pulling one pipe member apart from the other. Thus, the coupling may also be intentionally separated by hoisting up the installation while it is still connected to the wellhead, of unintentionally separated by movement of the ship. The coupling therefore provides a very useful feature for underwater oil or gas well installations. Further, the coupling can readily be re-connected by a diver when required in an underwater installation.

Advantageously, the pipe members lie on opposite sides of a transverse plane of separation, and each connector has a weakened portion in the transverse plane to cause the connection to break in the plane.

The annular member may co-operate with said one pipe member to form a second chamber therebetween, the coupling also including means to supply fluid under pressure to the second chamber to urge the annular member and said one pipe member together in the longitudinal direction opposite to that in which connector breaking movement takes place.

The other pipe member may comprise a main body portion surrounded by a flange rotatable relative to the main body portion about the longitudinal axis thereof, said frangible connectors passing through said rotatable flange.

The frangible pipe coupling may also include means resiliently urging the annular member and the one pipe member together in the longitudinal direction opposite to that in which connector breaking movement takes place.

One embodiment of the invention will now be described, by way of example, with reference to the accompanying drawings, of which:

Figure 1:
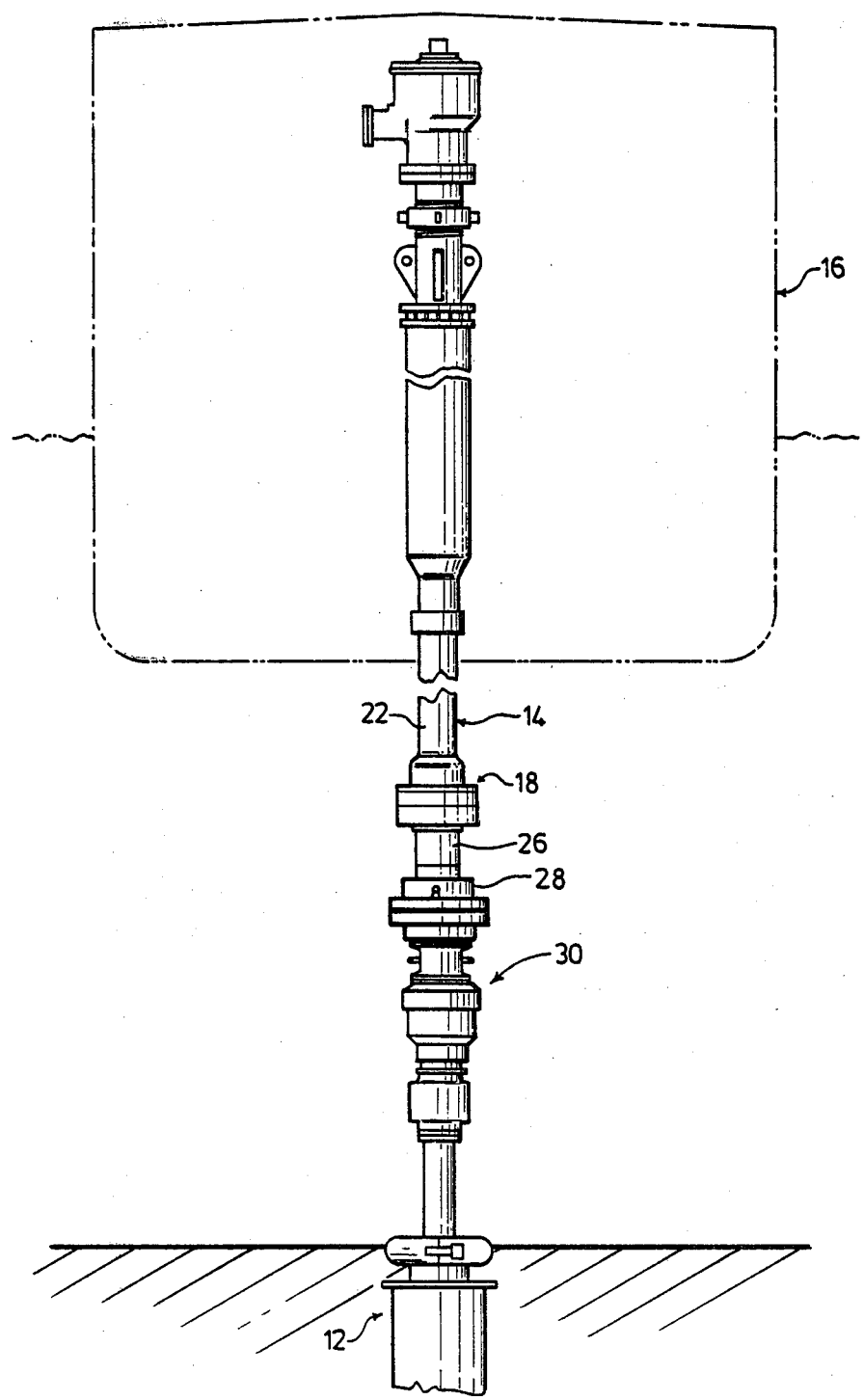
FIG. 1 is a diagrammatic side view of an underwater wellhead installation.

Referring to the drawings, an underwater wellhead installation includes a wellhead 12 at the bottom of a body of water and a riser assembly 14 extending from the wellhead 12 to a drill ship 16 on the surface of the water. The riser assembly 14 includes a frangible pipe coupling 18 in accordance with the invention, and various other conventional components whose nature will be readily apparent to a person skilled in the art.

The frangible pipe coupling 18 comprises an upper pipe member 20 which is welded to the lower end of a conductor barrel 22 which extends upwardly to the drill ship 16, and a lower pipe member 24 which is welded to the upper end of a conductor barrel 26 which extends upwardly from a conventional knuckle joint 28, the knuckle joint 28 being located immediately above a conventional blowout preventor stack 30.

Figure 2:
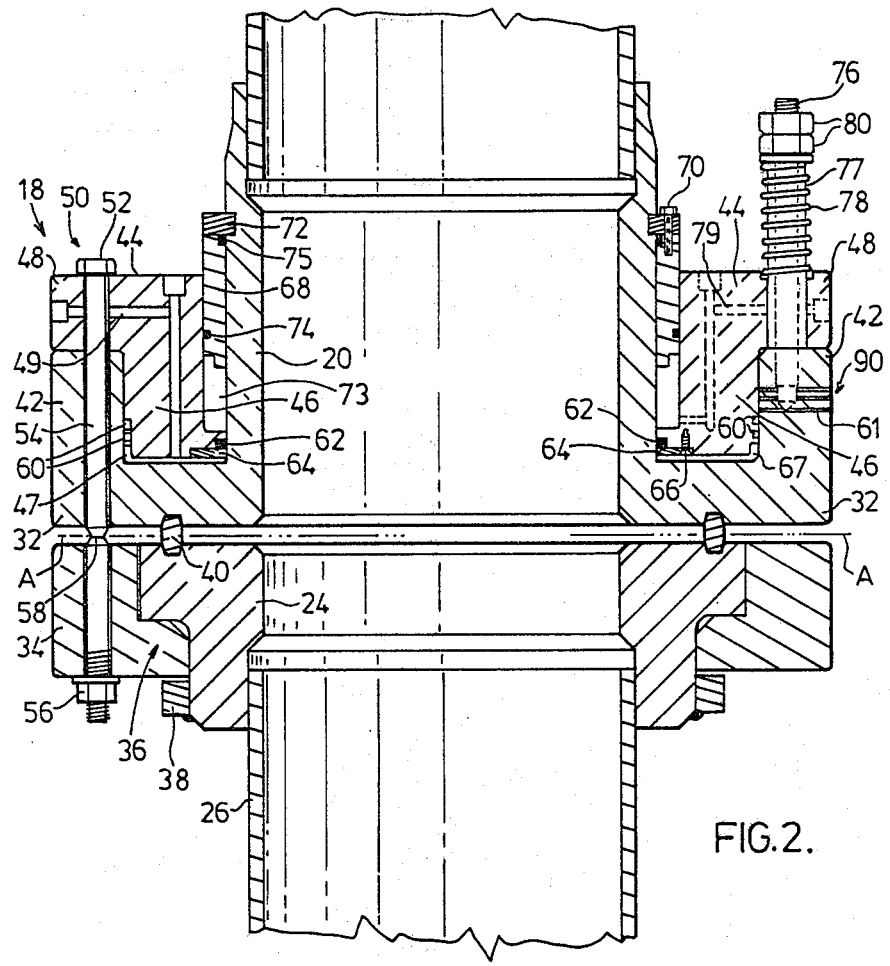
FIG. 2 is a sectional side view of a pipe coupling in accordance with the invention.

The upper pipe member 20 has an annular flange 32 at its lower end, the lower end of the upper pipe member 20 being separated from the upper end of the lower pipe member 24 along a transverse plane of separation indicated by the line A—A in FIG. 2. An annular sealing ring 40 seated in grooves in the lower end of the flange 32 and in the upper end of pipe member 24 extends across the space between the upper and lower pipe members 20, 24 and seals the interior thereof from the exterior. The lower pipe member 24 has an annular swivel flange 34 at its upper end, the swivel flange 34 being retained in position by a radially inner part 36 positioned between a downwardly-facing shoulder on the main part of the lower pipe member 24 and a support ring 38 welded to the main part of the lower pipe member 24.

The flange 32 of the upper pipe member 20 has an upwardly extending portion 42 at its radially outer end. An annular member 44 surrounds the main part of the upper pipe member 20 and has a piston portion 46 which extends downwardly into the annular space formed between the main part of the upper pipe member 20 and the upwardly extending portion 42 and is in sliding engagement with the walls thereof to form an annular chamber 47. A passage 49 extends through the annular member 44 from the chamber 47 to an external face of the annular member 44 for the supply of hydraulic fluid to the chamber 47, as will be described later.

The annular member 44 also has a shoulder portion 48 overlying the upwardly extending flange portion 42. A series of eight frangible bolts 50 (only one of which is shown) are equally spaced around the coupling, each bolt 50 having a head 52 engaging the shoulder portion 48 of the annular member 44, and a shaft 54 extending through aligned bores in the shoulder portion 48, the axially extending portion 42 of the flange 32 and the swivel flange 34. Each bolt 50 also has a threaded lower end on which a nut 56 is secured, the nut 56 engaging the bottom surface of the swivel flange 34. The shaft 54 of each bolt 50 has a weakened point 58 which is located in the plane of separation A—A of the pipe members 20, 24.

As previously mentioned, the annular member 44 has a piston portion 46 which cooperates with the upper pipe member 20 to form an annular chamber 47. The outer wall of piston portion 46 has grooves carrying sealing rings 60 which engage the internal wall of axial flange extension 42, and the inner wall of piston member 46 has a sealing ring 62 which engages the outer wall of the main part of upper pipe member 20. The sealing ring 62 is retained in position by a bearing ring 64, which in turn is held in place by screws 66. Three successively spaced passages 61 extend through the axially extending portion 42 just above sealing rings 60, when the annular member 44 is in the position shown in FIG. 2, to an external surface for pressure relief purposes which will be described later.

The upper part of the inner wall of piston portion 46 is recessed and engages an annular sleeve 68 surrounding the main part of the upper pipe member 20 thereby forming a second annular chamber 73. The sleeve 68 is secured by bolts 70 to a split ring 72 mounted in an annular groove in the exterior of the main part of the upper pipe member 20. The lower end of the sleeve 68 carries a sealing ring 74 mounted in a groove in its outer surface which engages the recessed upper part of the inner wall of piston portion 46. The upper end of the sleeve 68 carries a sealing ring 75 in a groove in its inner corner, the sealing ring 75 engaging the outer surface of the pipe member 20 and being retained in place by split ring 72. A passage 79 extends through the annular member 44 from the chamber 73 to an external face of the annular member 44 for the supply of hydraulic fluid to the chamber 73 as will be described later.

The annular member 44 is resiliently urged towards the flange 32 of the upper pipe member 20 by four equally-angularly spaced stud and spring arrangements, each comprising a stud 76 passing through a sleeve 77 mounted in a bore in the shoulder 48 of the annular member 44, the stud 76 being secured at its lower end in a threaded bore in the axial extension 42 of the flange 32 of the upper pipe member 20. The lower end of the sleeve 77 rests upon the axial extension 42, and the upper end of the sleeve 77 projects above the shoulder 48. The upper end of the stud 76 projects above the sleeve 77, and a spring 78 surrounding the projecting portion of the sleeve 77 acts between the upper surface of the shoulder 48 and a nut 80 secured onto the upper threaded end of the stud 76.

In use, passage 49 is connected to a hydraulic power supply on the drill ship 16. In adverse weather conditions, fluid under pressure can be supplied to the chamber 47 through passage 49 to force the annular member 44 upwardly relative to the flange 32 against the force of springs 78 and thereby cause the bolts 50 to fracture at their weakened portion 58, thereby separating the pipe members 20, 24 from one another. When this happens, annular member 44 will move upwardly relative to the axially-extending portion 42 against the force of springs 78 so that the sealing rings 60 successively pass the ends of passages 61, thereby releasing hydraulic pressure in chamber 47 to the exterior and removing hydraulic force on springs 78. Also, the release of hydraulic pressure in chamber 47 indicates to the operator on the drill ship 16 that separation has occurred.

It will be noted that fracture of the bolts 50 at the weakened portion 58 will also occur if sufficient tensile load is placed upon the upper and lower pipe members 20, 24 while the installation is still connected to the wellhead 12. Such tensile load may be caused be hoisting up the installation while it is still connected to the wellhead 12 or by movement of the drill ship 16.

If separation of the described pipe coupling has occurred, the separated parts may readily be re-connected by a diver. Hydraulic pressure can be applied through passage 79 by the diver using a pressure supply line from the drill ship 16 to the pressure chamber 73 and thereby ensure that the annular member 44 abuts the axially extending portion 42. Also, the diver can readily swivel flange 34 to align the bores therein with the bores in the upper pipe member 20 to enable new frangible bolts 50 to be fitted. The stud and spring arrangements 76, 78 also serve to maintain alignment of the bores in annular member 44 and axially extending portion 42 for this purpose.

The pipe coupling may also be provided with bores similar to the bores for the frangible bolts 50 but intended for receiving non-frangible boltss which can be used as safety bolts during installation and removal of the riser assembly 14, and which can also be used during re-connection by a diver to assist in aligning the respective bores and in obtaining the required eensile force to set the sealing ring 40 in its grooves before installing the frangible bolts 50.

Other embodiments will be readily apparent to a person skilled in the art, the scope of the invention being defined in the appended claims.

What I claim as new and desire to protect by Letters Patent of the United States is:

1. A frangible pipe coupling comprising a pair of pipe members, frangible means connecting the pipe members together, said frangible connecting means comprising a plurality of frangible connectors extending between the pipe members and normally holding the pipe members in sealed engagement with one another, an annular member surrounding one of the pipe members and being slidably mouned thereon for longitudinal sliding movement relative thereto, said annular member cooperating with said one pipe member to form a chamber therebetween, means for supplying fluid under pressure into said chamber to effect longitudinal sliding movement of the annular member relative to the said one pipe member, said annular member being connected to the frangible connectors to cause said relative movement betwen the annular member and the said one pipe member to break said frangible connectors and thereby separate the pipe members from one another.

2. A frangible pipe coupling according to claim 1 wherein the pipe members lie on opposite sides of a transverse plane of separation, and each connector has a weakened portion in said transverse plane to cause breakage of the connector to occur in said plane.

3. A frangible pipe coupling according to claim 1 wherein said annular member co-operates with said one pipe member to form a second chamber therebetween, and the coupling also includes means to supply fluid under pressure to the second chamber to urge the annular member and said one pipe member together in the longitudinal direction opposite to that in which connector breaking movement takes place.

4. A frangible pipe coupling according to claim 1 wherein said other pipe member comprises a main body portion surrounded by a flange rotatable relative to the main body portion about the longitudinal axis thereof, said frangible connectors passing through said rotatable flange.

5. A frangible pipe coupling according to claim 1 including means resiliently urging the annular member and said one pipe member together in the longitudinal direction opposite to that in which connector breaking movement takes place.

* * * * *